(12) United States Patent
Akiyama et al.

(10) Patent No.: US 6,848,326 B2
(45) Date of Patent: *Feb. 1, 2005

(54) LINEAR GUIDE APPARATUS

(75) Inventors: Masaru Akiyama, Gunma (JP); Soichiro Kato, Gunma (JP); Shinya Nakamura, Gunma (JP); Shiroji Yabe, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/397,296

(22) Filed: Mar. 27, 2003

(65) Prior Publication Data

US 2003/0188593 A1 Oct. 9, 2003

Related U.S. Application Data

(62) Division of application No. 09/785,268, filed on Feb. 20, 2001, now Pat. No. 6,561,049.

(30) Foreign Application Priority Data

Feb. 18, 2000 (JP) ........................................ 2000-041547

(51) Int. Cl.$^7$ .............................................. F16C 29/06
(52) U.S. Cl. .............................. 74/89.32; 384/7; 384/8; 384/43; 384/49
(58) Field of Search ........................... 74/89.32, 89.39; 384/7, 8, 43, 44, 49, 50, 45; 188/43, 60, 67, 83, 170

(56) References Cited

U.S. PATENT DOCUMENTS

| 4,417,771 A | 11/1983 | Teramachi |
| 4,773,770 A | 9/1988 | Osawa et al. |
| 5,268,970 A | 12/1993 | Tanaka |
| 5,273,367 A | 12/1993 | Tanaka |
| 5,678,663 A | * 10/1997 | Watanabe et al. ............. 188/67 |
| 5,732,799 A | 3/1998 | Chikamatsu et al. |
| 6,179,468 B1 | 1/2001 | Thorstens et al. |
| 6,227,336 B1 | 5/2001 | Rudy |
| 6,336,528 B1 | 1/2002 | Rudy |

FOREIGN PATENT DOCUMENTS

| DE | 68799 A | 5/1969 |
| DE | 39 08 588 A1 | 8/1990 |
| DE | 29613345 U1 | 11/1996 |
| JP | 7-54845 | 2/1995 |
| WO | WO 92/20490 | 11/1992 |

* cited by examiner

Primary Examiner—William C. Joyce
(74) Attorney, Agent, or Firm—Sughrue Mion, PLLC

(57) ABSTRACT

The linear guide apparatus includes a guide rail 3 including a rolling body rolling groove 8 and a friction apply unit 6 assembled to the guide rail 3. The friction apply unit 6 includes a unit main body 15, a brake member 16, an oil pressure cylinder 17 and a plate spring 32. The brake member 16 is disposed so as to face the side surface 3a of the guide rail 3 and can be contacted with the other portions of the side surface 3a than the rolling body rolling groove 8 thereof. The oil pressure cylinder 17 includes a piston member 20 which is structured to be driven in a positive direction to thereby press the brake member 16 against the side surface 3a of the guide rail 3 and also the piston member 20 can be driven in the opposite direction to thereby remove the pressure of the brake member 16 from the side surface 3a.

7 Claims, 5 Drawing Sheets

LINEAR GUIDE APPARATUS

This is a divisional of application No. 09/785,268 filed Feb. 20, 2001 now U.S. Pat. No. 6,561,049; the disclosure of which is incorporated herein by reference.

BACKGROUND OF THE INVENTION

1. Field of the Invention

The present invention relates to a linear guide apparatus which is used in a machine tool and an industrial machine.

2. Description of the Related Art

To guide a table of a machine tool or an industrial machine which can be moved at a relatively high speed by a ball screw or a linear motor, there is used such a linear guide apparatus 51 as shown in FIG. 8.

The linear guide apparatus 51 shown in FIG. 8, which is generally called a linear guide, comprises guide rails 53 serving as guide members respectively extending in one direction, and sliders 54 movably assembled to their associated guide rails 53. In the outer surface of each guide rail 53, there is formed a rolling body rolling groove 58 which serves as a guide surface; in each slider 54, there is formed a load rolling body rolling groove serving as a load guide surface in such a manner that it faces the rolling body rolling groove 58 of the guide rail 53; between the rolling body rolling groove 58 and load rolling body rolling groove, there are interposed a large number of balls serving as rolling bodies; and, the slider 54 can be moved along the guide rail through these rolling bodies.

As the guide rails 53, there are used a pair of guide rails 53 which are arranged parallel to each other, and they are respectively mounted on a bed 59 which is generally placed on a floor. In the case of the sliders 54, a pair of sliders 54 are assembled to each guide rail 53 in such a manner that they are spaced from each other and can be moved along the longitudinal direction of the associated guide rail 53. The sliders 54 are respectively mounted on a table 52.

A drive mechanism 55, which is used to drive the table 52, includes a screw shaft 60 and a ball nut 61. The screw shaft 60 includes a screw groove formed on the outer surface thereof and is mounted on the bed 59 along the guide rails 53 in such a manner that it can be rotated about its own axis. The ball nut 61 is threadedly engaged with the screw shaft 60 through a large number of balls serving as the rolling bodies and is mounted on the table 52. The drive mechanism 55 is structured such that it can rotate the screw shaft 60 to thereby move the table 52 along the guide rails 53 through the ball nut 61.

Also, the linear guide apparatus 51 includes a friction apply unit (not shown) which is used to stop the slider 54 at a given position of the guide rail 53. The friction apply unit includes a brake member disposed so as to be opposed to the upper surface or side surface of the guide rail 53 or to the rolling body rolling groove 58, and a drive device which is capable of pressing the brake member toward the guide rail 53. The brake member is structured such that, in case where it is pressed toward the guide rail 53 by the drive means and is thereby contacted with the guide rail 53, it can generate a frictional force.

The friction apply unit pushes the brake member using the drive device to apply a frictional force to the slider 54 and table 52 to thereby set them at their given positions of the guide rail 53. By driving the friction apply unit, the damping characteristic of the vibrations of the slider 54 and table 52 can be enhanced and thus the rigidity of the slider 54 and table 52 can be enhanced.

However, in the thus structured linear guide apparatus 51, when the brake member is pressed against the upper surface of the guide rail 53 to thereby generate a frictional force, the slider 54 and table 52 are pushed up as the brake member is pressed against the guide rail 53, which degrades the positioning accuracy of the slider 54 and table 52.

In view of this problem, in Japanese Patent Unexamined Publication No. Hei. 7-54845 (JP-A-7-54845), there is disclosed a linear guide apparatus in which the brake member is fitted into the rolling body rolling groove 58 of the side surface of the guide rail 53 and the brake member is pressed by an oil pressure cylinder. In this case, since the brake member is fitted into the rolling body rolling groove 58, there is no possibility that the slider 54 and table 52 are pushed up when braking. However, because the brake member is pressed against the rolling body rolling groove 58 to thereby a frictional force, there is a tendency that the rolling body rolling groove 58 is worn to such a degree that cannot be ignored, which results in the degraded positioning accuracy of the slider 54 and table 52.

Also, in the above-cited publication JP-A-7-54845, when removing the braked condition, the oil pressure of the oil pressure cylinder is removed to thereby produce a non-load condition and thus the brake member and the piston of the oil pressure cylinder are retreated due to the elastic force of a coiled spring.

Here, in such structure where the brake member and the piston of the oil pressure cylinder are retreated due to the elastic force of a coiled spring, in case where the response characteristic (speed) of removal of the braked condition is enhanced to thereby control the frictional force with high accuracy, the elastic force of the coiled spring must be set fairly large.

However, in case where the elastic force of the coiled spring is set large, there increases the load that is produced when the brake member is pressed by the oil cylinder against the elastic force of the coiled spring, which degrades the response characteristic of the brake member when it is pressed.

Further, as in the above-cited publication JP-A-7-54845, in the case of a structure in which a brake member (brake shoe) is slidably fitted into a sliding groove formed in a damping block, there exists a clearance between the sliding groove and brake member and this clearance causes the slider 54 to play in the advancing direction thereof. This invites the delayed generation of the frictional force, which makes it difficult to control the frictional force with high accuracy.

SUMMARY OF THE INVENTION

The present invention aims at eliminating the above drawbacks found in the conventional linear guide apparatus. Accordingly, it is an object of the invention to provide a linear guide apparatus which not only can keep the positioning precision at a high level but also can enhance the response characteristic of a brake member to thereby control a frictional force generated by the brake member with high accuracy.

In attaining the above object, according to the invention, there is provided a linear guide apparatus, comprising: a guide member including a guide surface formed on the outer surface thereof; a slider disposed on the guide member so as to be movable along the longitudinal direction of the guide member and including a load guide surface formed so as to face the guide surface of the guide member; a brake member disposed so as to face the side surface of the guide member and contactable with the other portions of the side surface of the guide member than the guide surface thereof; a drive device including an advance and retreat member movable in a direction to be contacted with and separated from the side surface of the guide member, the drive device being capable of driving the advance and retreat member in a direction to approach the side surface of the guide member to thereby press the brake member against the side surface of the guide member and also capable of driving the advance and retreat member in a direction to part away from the side surface of the guide member to thereby remove the pressure thereof; and, a support member for supporting the brake member with high rigidity in other directions thereof than the direction to be contacted with and separated from the side surface of the guide member.

In the thus structured linear guide apparatus, since the brake member is contacted with the other portions of the side surface of the guide member than the guide surface thereof, not only the slider can be prevented from being pushed up but also the guide surface can be prevented against wear. Thanks to this, the positioning accuracy of the slider can be kept at a high level.

Also, the drive device, which is used to drive the brake member, includes an advance and retreat member which can be moved in the direction to be contacted with and separated from the side surface of the guide member. And, the drive device is structured such that it can drive the advance and retreat member in the direction to approach the side surface of the guide member to thereby press the brake member against the side surface of the guide member and also can drive the advance and retreat member in the direction to part away from the side surface of the guide member to thereby remove the pressure thereof. Also, the brake member is supported with high rigidity in other directions thereof than the direction to be contacted with and separated from the side surface of the guide member. Thanks to this, the brake member can be operated with no delay with respect to the operation of the advance and retreat member, that is, can be operated quickly with a good response characteristic with respect to the operation of the advance and retreat member, thereby being able to control the frictional force of the brake member with high accuracy.

DETAILED DESCRIPTION OF THE PREFERED EMBODIMENT

Now, description will be given below of the mode for carrying the invention with reference to FIGS. 1 to 7.

Figure 1:
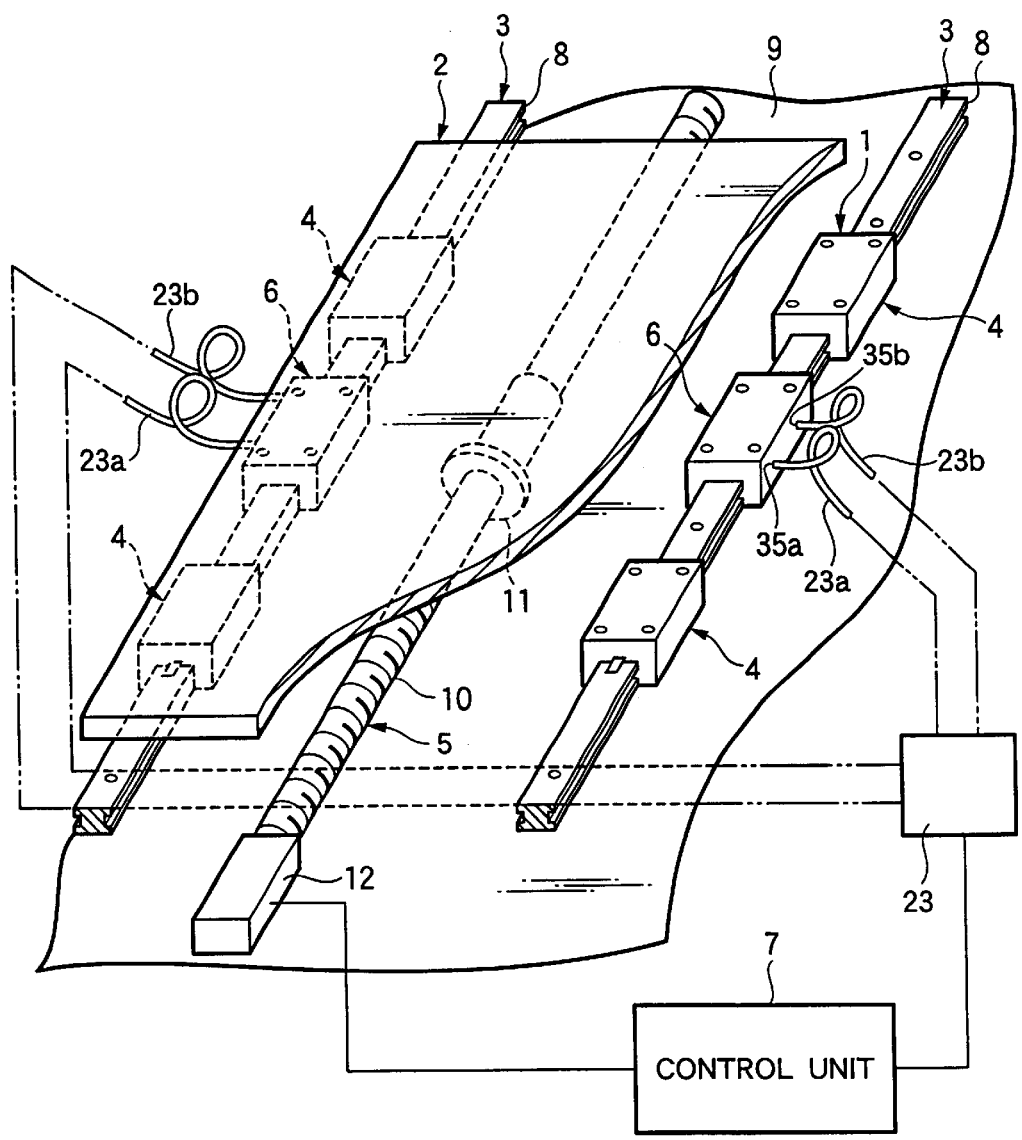
FIG. 1 is a perspective view of a linear guide apparatus according to a first embodiment of the invention.

FIGS. 1 to 4 respectively show a first embodiment of a linear guide apparatus according to the invention. The linear guide apparatus according to the first embodiment is used to guide the movement of a table 2; and, as shown in FIG. 1, it comprises a guide rail 3 which serves as a guide member, a slider 4, a drive mechanism 5, a friction apply unit 6, and control unit 7 serving as control means.

Referring to the guide rail 3, there are disposed a pair of guide rails which respectively extend in one direction and are arranged in parallel to each other. The two guide rails 3 are respectively mounted on a bed 9 which is to be installed on a floor. In the outer surface of each guide rail 3, there is formed a rolling body rolling groove 8 having an arc-shaped section, which serves as a guide surface extending in the longitudinal direction of the guide rail 3.

Figure 2:
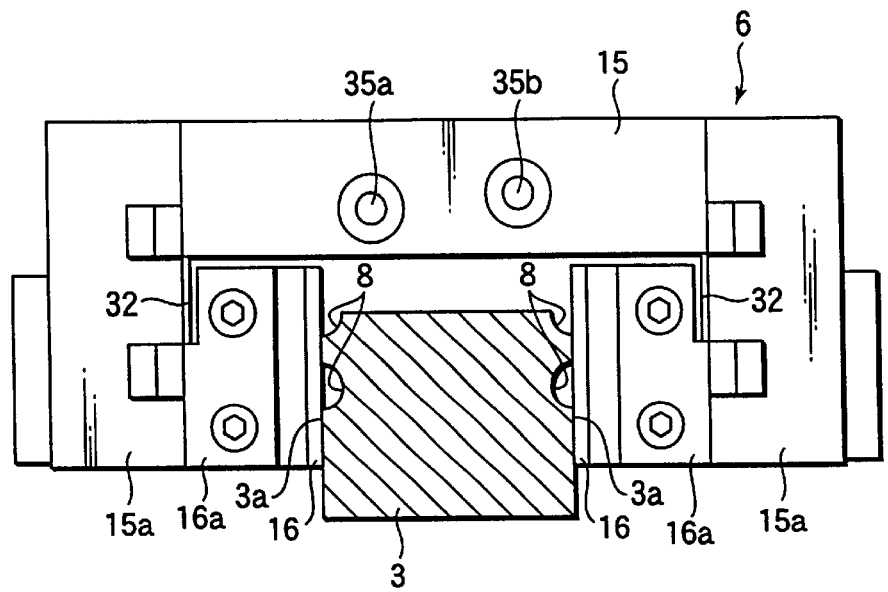
FIG. 2 is a front view of a friction apply unit employed in the linear guide apparatus.

By the way, in the present embodiment, the guide rail 3 is structured such that, as shown in FIG. 2, the shape of the section thereof is rectangular and it includes two rolling body rolling grooves 8 respectively formed along the longitudinal direction of the two side surfaces thereof.

In the case of the slider 4, there are disposed a pair of sliders in such a manner that they respectively straddle their associated guide rail 3 and are spaced from each other; and also, the pair of sliders 4 can be moved along the longitudinal direction of the guide rail 3. The sliders 4 are respectively mounted on the table 2 which can be moved at a relatively high speed.

Each slider 4 includes load rolling body rolling grooves serving as load guide surfaces (not shown) which are formed so as face their associated rolling body rolling grooves 8 of the guide rail 3. Between the rolling body rolling grooves 8 and load rolling body rolling grooves, there are interposed a large number of balls which are made of steel or ceramics and serve as rolling bodies.

These balls are allowed to roll freely on the rolling body rolling grooves 8 and load rolling body rolling grooves. As these balls roll on the rolling body rolling grooves 8 and load rolling body rolling grooves, the sliders 4 and table 2 are allowed to move freely along the longitudinal direction of the guide rail 3.

The drive mechanism 5 includes a screw shaft 10 and a motor 12 serving as a drive device. The screw shaft 10 has a screw groove formed in the outer surface thereof and is mounted on the bed 9 in such a manner that it can be rotated around its own axis. The ball nut 11 is mounted on the table 2 in such a manner that it is threadedly engaged with the screw shaft 10 through a large number of balls serving as rolling bodies.

The motor 12 is mounted on the bed 9 in such a manner that its output shaft is connected to the screw shaft 10. The motor 12 is capable of rotating the screw shaft 10 around its own axis. That is, the motor 12, by rotating the screw shaft 10, can move the table 2 along the guide rail 3 through the ball nut 11.

Each friction apply unit 6 is assembled on its associated guide rail 3 between a pair of sliders 4 respectively assembled on the guide rail 3 in such a manner that it straddles the guide rail 3. The friction apply units 6 are respectively mounted on the table 2 and can be moved together with their associated sliders 4 along the longitudinal direction of their associated guide rails 3.

Figure 3:
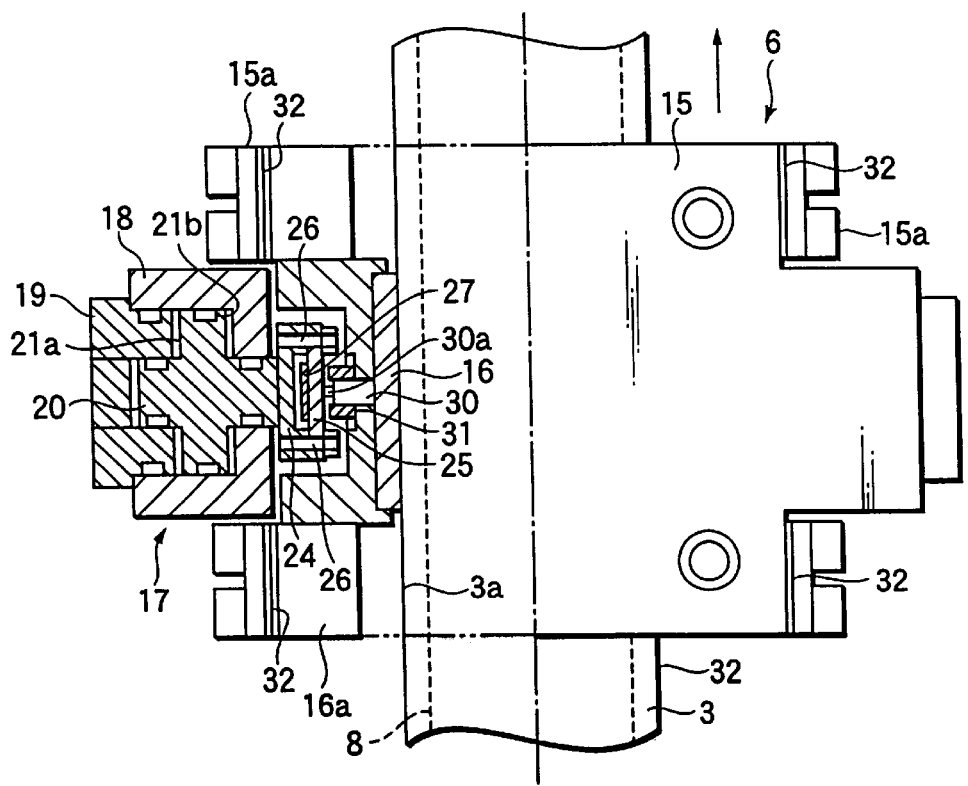
FIG. 3 is a partially broken plan view of the friction apply unit.
Figure 4:
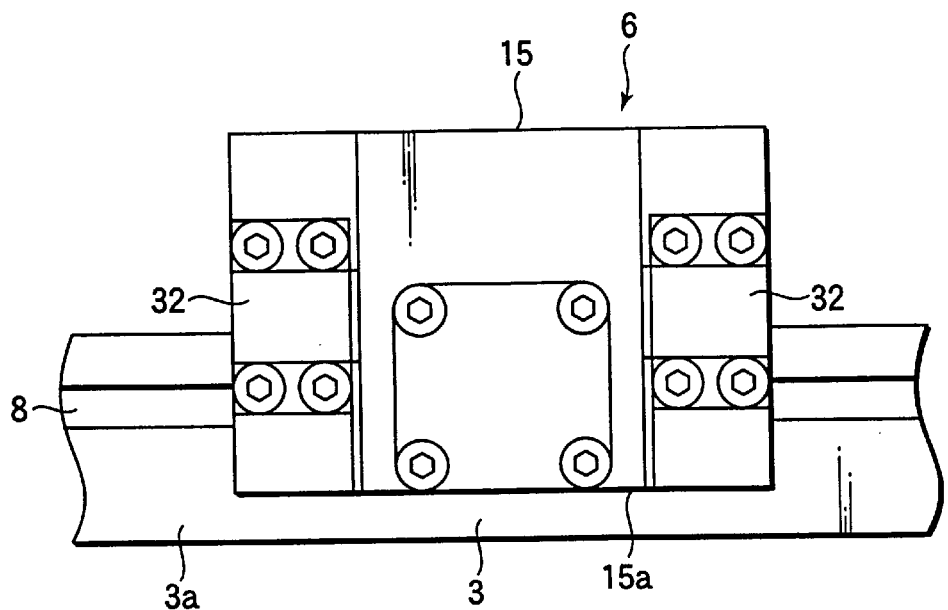
FIG. 4 is a side view of the friction apply unit.

Each friction apply unit 6, as shown in FIGS. 2 to 4, includes a unit main body 15, a brake member 16, and an oil pressure cylinder 17 serving as a drive device. The unit main body 15 is mounted on the guide rail 3 in such a manner that it straddles the guide member 3 and can be moved along the longitudinal direction of the guide rail 3. The unit main body 15 is mounted on the table 2.

The unit main body 15 includes two skirt portions 15a which are respectively disposed on the two side surfaces 3a of the guide rail 3 and are spaced from each other and opposed to each other; and, in the inside portions of the two skirt portions 15, there are disposed two brake members 16 respectively through their associated holders 16a. The two brake members 16 are respectively disposed so as to be opposed to the two side surfaces 3a of the guide rail 3, are supported such that they can be moved together with the holders 16a toward the side surface 3a of the guide rail 3, and can be contacted with the other portions of the two side surfaces of the guide rail 3 than the rolling body rolling grooves 8.

The oil pressure cylinders 17 are respectively disposed on the two skirt portions 15a of the unit main body 15 in such a manner that they can press their respective brake members 16 against the other portions of the two side surfaces 3a of the guide rails 3 than the rolling body rolling grooves 8 thereof.

Each oil pressure cylinder 17 includes a cylinder member 18 disposed so as to penetrate through the skirt portion 15a of the unit main body 15, a cover member 19 which covers tightly the outside opening of the cylinder member 18, and a piston member 20 which is slidably fitted into the cylinder member 18 and serves as an advance and retreat member.

Between the piston member 20 and cover member 19, there is formed a first oil chamber 21a and, between the piston member 20 and the one-end-side end wall of the cylinder member 18, there is formed a second oil chamber 21b; and, into these first and second oil chambers 21a and 21b, there can be selectively supplied pressure oil through an oil pressure device 23 shown in FIG. 1.

When the pressure oil is supplied into the first oil chamber 21a, the pressure of the pressure oil causes the piston member 20 to move in a direction to approach the side surface 3a of the guide rail 3 and, when the pressure oil is supplied into the second oil chamber 21b, the pressure of the pressure oil causes the piston member 20 to move in a direction to part away from the side surface 3a of the guide rail 3.

The one-end-side end portion of the piston member 20 projects from the cylinder member 18 and, on the projecting end face of the piston member 20, there is mounted a case 24 which has a plate-shaped section and serves as a pressure detect portion. And, on the opening of the case 24, there is mounted a rectangular-shaped beam 25 through a bolt 26 and, on the inner surface of the beam 25, there is mounted a strain gauge 27 which serves as a detect device.

On the brake member 16, there is mounted a screw shaft 30 integrally therewith, the screw shaft 30 penetrates through the holder 16a, and a nut 31 is threadedly engaged with the penetrating end of the screw shaft 30; and, by tightening the nut 31, the brake member 16 and holder 16a are connected together as an integrated body. And, on the end face of the screw shaft 30, there is provided a projecting portion 30a, while the outer surface of the beam 25 is in contact with the projecting portion 30a.

Between the skirt portion 15a of the unit main body 15 and the holder 16a holding the brake member 16, there is interposed a plate spring 32 serving as a support device: that is, the plate spring 32 holds the brake member 16 together with the holder 16a on the skirt portion 15a of the unit main body 15.

And, the holder 16a and brake member 16 are elastically energized by the plate spring 32 in a direction to part away from the side surface 3a of the guide rail 3. The plate surface of the plate spring 32 is set so as to extend almost parallel to the side surface 3a of the guide rail 3, while the holder 16a and brake member 16 are supported by the plate spring 32 in such a manner that they have high rigidity in other directions than the direction to part away from the side surface 3a of the guide rail 3, that is, in the longitudinal and vertical directions of the guide rail 3.

In the unit main body 15, there are formed a pair of first and second oil supply ports 35a and 35b and, to these oil supply ports 35a and 35b, as shown in FIG. 1, there are connected oil pressure pipes 23a and 23b which are respectively guided out from the oil pressure supply device 23.

And, when the oil pressure supply device 23 supplies the pressure oil into the first oil chamber 21a of the oil pressure cylinder 17 through one oil pressure pipe 23a, due to the oil pressure of the pressure oil supplied, the piston member 20 is caused to advance in a direction to approach the side surface 3a of the guide rail 3; and, when the pressure oil is supplied into the second oil chamber 21b through the other oil pressure pipe 23b, due to the oil pressure of the pressure oil supplied, the piston member 20 is caused to advance in the direction to part away from the side surface 3a of the guide rail 3.

By the way, when the pressure oil is supplied into the first oil chamber 21a, the oil within the second oil chamber 21b is discharged through a discharge passage (not shown); and, when the pressure oil is supplied into the second oil chamber 21b, the oil within the first oil chamber 21a is discharged through a discharge passage (not shown).

Now, the control unit 7, which is a processor, controls the motor 12 of the drive mechanism 5 to thereby control the moving speed of the table as well as controls the oil pressure supply device 23 to thereby control the movement of the piston member 20 of the oil pressure cylinder 17.

Next, description will be given below of the operation of the above-mentioned linear guide apparatus 1. While the piston member 20 of the oil pressure cylinder 17 retreats in the direction to part away from the side surface 3a of the guide rail 3, due to the elastic force of the plate spring 32, the brake member 16 is kept in a state where it parts away from the side surface 3a of the guide rail 3. Therefore, in this state, the response characteristic of the movement of the slider 4, which is driven by the drive device 5, can be kept in a good condition.

In this state, in case where the pressure oil is supplied from the oil pressure supply device 23 into the first oil chamber 21a of the oil pressure cylinder 17 through one oil pressure pipe 23a, due to the oil pressure of the pressure oil supplied, the piston member 20 is caused to advance in the direction to approach the side surface 3a of the guide rail 3; in response to the advancing movement of the piston member 20, the brake member 16 is pushed through the beam 25 against the elastic force of the plate spring 32; due to this pressure, the brake member 16 is pressed against the side surface 3a of the guide rail 3 to thereby produce a frictional force between them; and, this frictional force enhances the damping characteristic and rigidity of the linear guide apparatus 1. The frictional force of the brake member 16 can be adjusted by controlling the oil pressure supply device 23 through the control unit 7.

When the brake member 16 is pressed through the beam 25, there is produced in the beam 25 a strain which corresponds to the pressure, and the level of the strain is detected by the strain gauge 27. And, a detect signal issued from the strain gauge 27 is sent to the control unit 7.

That is, the strain gauge 27 detects the level of the pressure applied to the brake member 16 as well as the timing of the pressing operation with accuracy, and data on the detected information are fed back to the control unit 7, which makes it possible to control the frictional force of the brake member 16 with high accuracy. By the way, as the detect device for detecting the pressure of the brake member 16, there can also be used a load cell instead of the strain gauge.

On the other hand, in case where the pressure oil is supplied into the second oil chamber 21b through the other oil pressure pipe 23b, due to the oil pressure of the pressure oil supplied, the piston member 20 is caused to retreat in the direction to part away from the side surface 3a of the guide rail 3 and, in response to this retreating movement of the piston member 20, there is removed the pressure that has been applied to the brake member 16. With removal of the pressure, the brake member 16 is caused to retreat in the direction to part away from the side surface 3a of the guide rail 3 due to the elastic force of the plate spring 32. Owing to the retreating movement of the brake member 16, the frictional force existing between the brake member 16 and guide rail 3 is caused to vanish, so that the response characteristic of the movement of the slider 4 can be enhanced up to a high level.

In this case, the piston member 20 is not retreated due to the elastic force of the plate spring 32 but is retreated due to the pressure of the pressure oil supplied to the second oil chamber 21b. That is, the plate spring 32 plays only the role to retreat the brake member 16; and, the brake member 16 can receive the elastic force of the plate spring effectively and thus can move properly, thereby being able to enhance the response characteristic (speed) of the movement of the brake member 16.

And, because the elastic force of the plate spring 32 can be applied to the brake member 16 effectively, there is no need to increase the elastic force of the plate spring 32 specially, that is, the elastic force of the plate spring 32 can be set small. This can reduce the load necessary to push the brake member 16 against the elastic force of the plate spring 32, which makes it possible to enhance the response characteristic of the brake member 16 when it is pushed.

As described above, the pushing operation and pressure removing operation of the brake member can be carried out quickly, so that the frictional force to be produced between the brake member 16 and the side surface 3a of the guide rail 3 can be controlled with high accuracy.

And, since the brake member 16 supported through the holder 16a is supported by the plate spring 32 with high rigidity in the longitudinal and vertical directions of the guide rail 3, the frictional force to be produced between the brake member 16 and the side surface 3a of the guide rail 3 can be controlled with high accuracy.

Further, in the present linear guide apparatus 1, because the brake member 16 is contacted with other portions of the side surface 3a of the guide rail 3 than the rolling body rolling groove 8 thereof, not only the slider 4 can be prevented from being pushed up but also the rolling body rolling groove 8 can be prevented from being worn. This makes it possible to keep the positioning accuracy of the slider 4 and table 2 at a high level.

By the way, as the drive device, besides the oil pressure cylinder 17 as in the present embodiment, there can also be used other devices such as a piezoactuator, a pneumatic cylinder and a solenoid.

Figure 5:
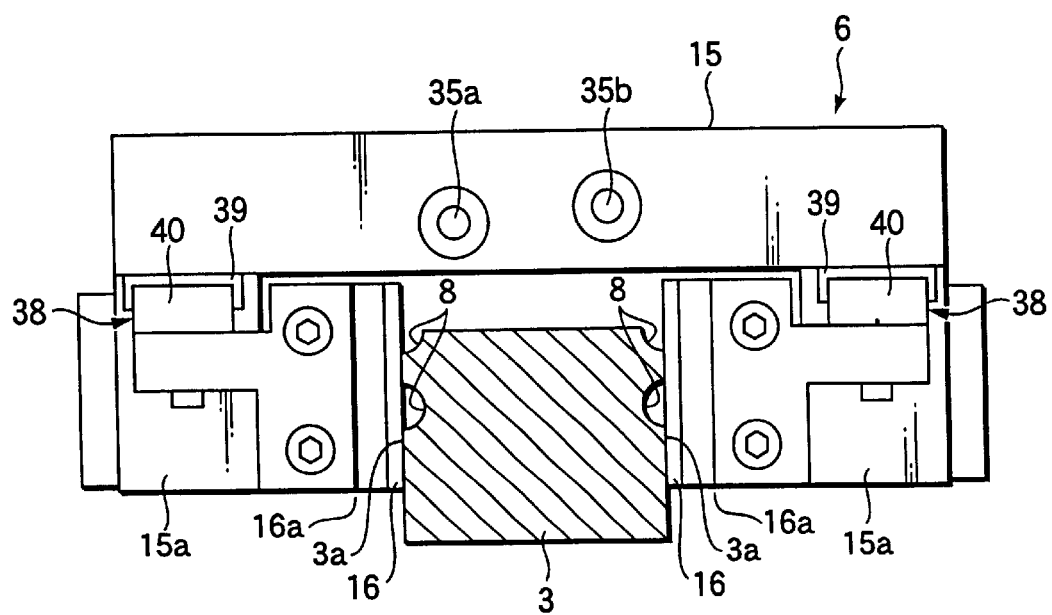
FIG. 5 is a front view of a friction apply unit employed in a linear guide apparatus according to a second embodiment of the invention.
Figure 6:
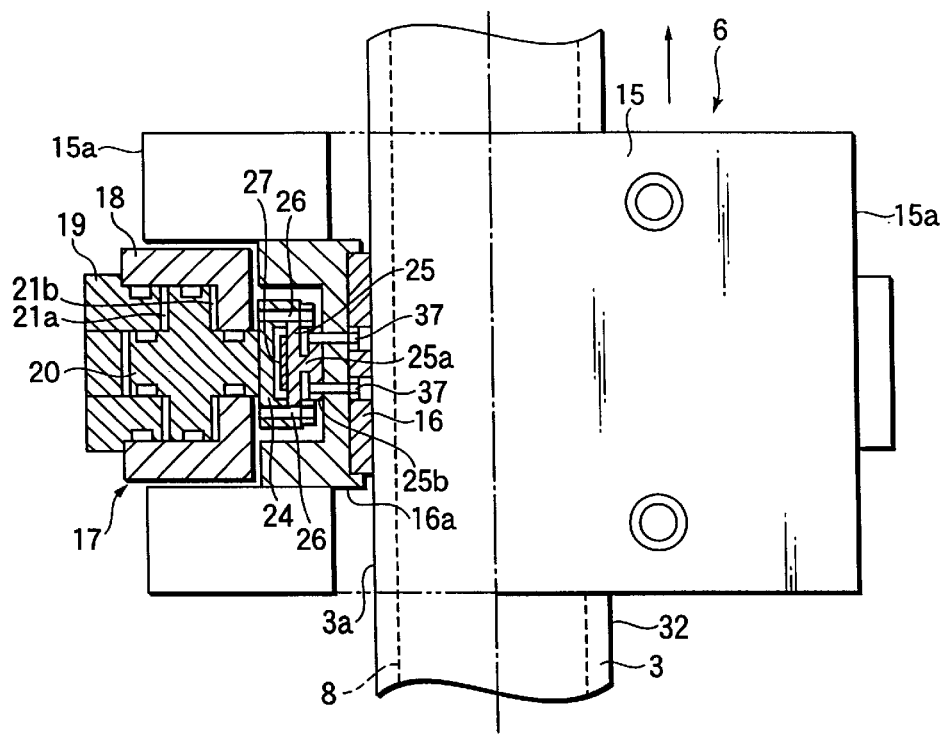
FIG. 6 is a partially broken plan view of the friction apply unit shown in FIG. 5.
Figure 7:
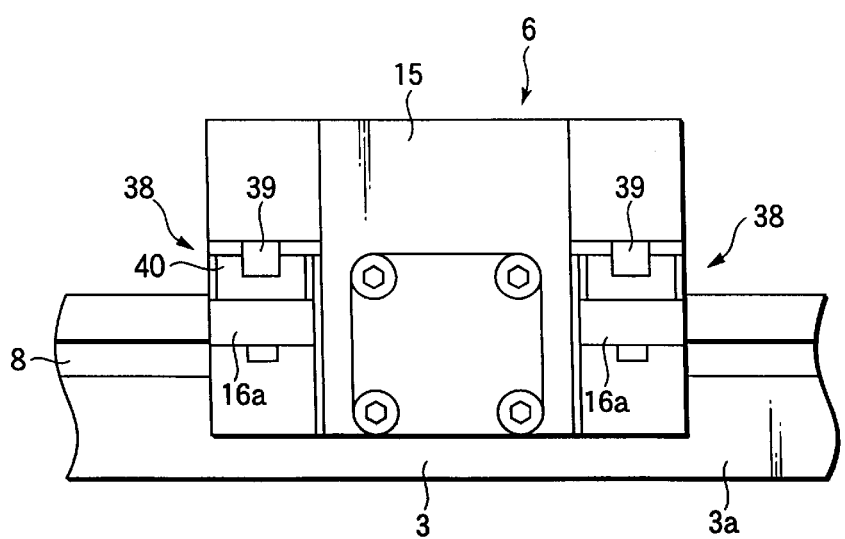
FIG. 7 is a side view of the friction apply unit shown in FIG. 5.
Figure 8:
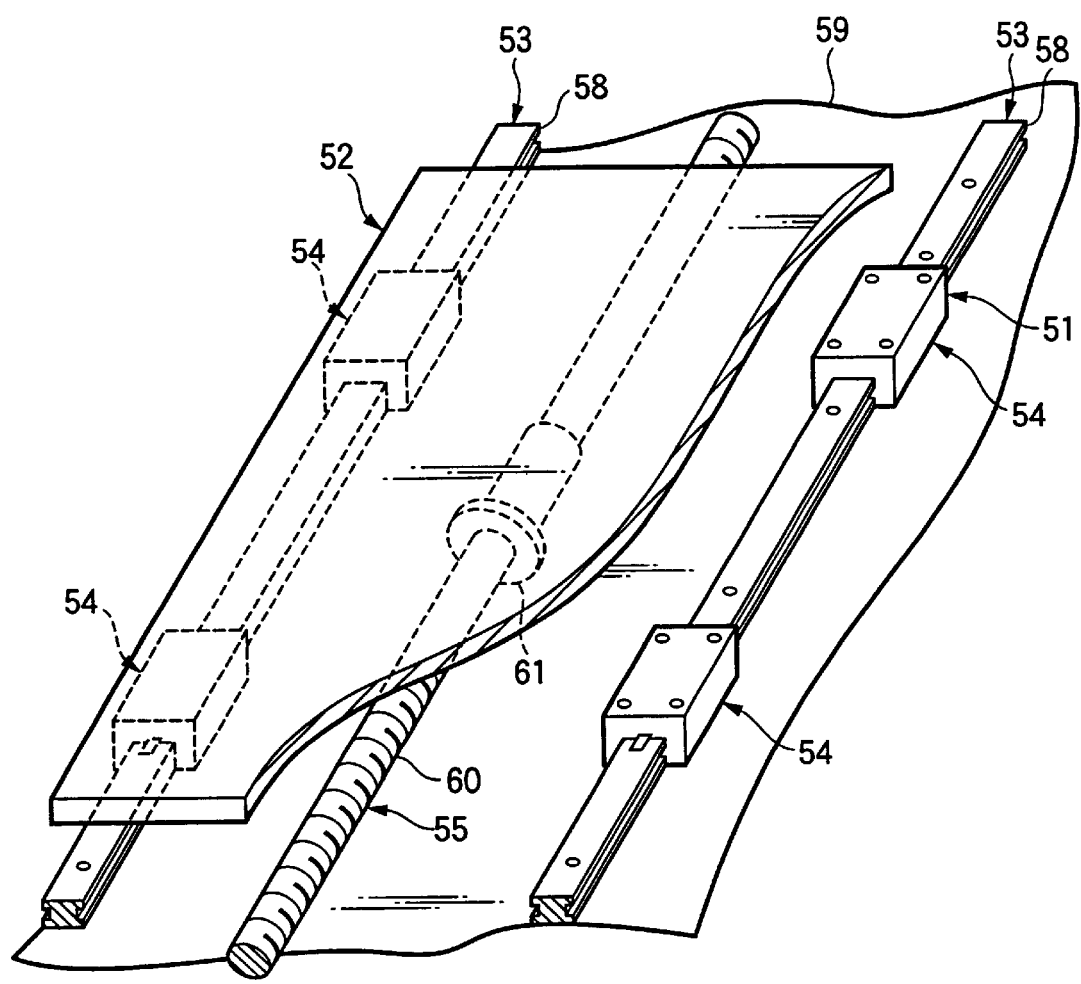
FIG. 8 is a perspective view of a conventional linear guide apparatus.

Now, FIGS. 5 to 7 respectively show a second embodiment of a linear guide apparatus according to the invention.

In the second embodiment, the brake member 16 and holder 16a are connected to the piston member 20 of the oil pressure cylinder 17, and thus the brake member 16 and holder 16a can be moved integrally with the piston member 20 in a direction to be contacted with and separated from the side surface 3a of the guide rail 3.

Referring in more detail to the structure of the second embodiment, in the middle portion of a beam 25 disposed in a pressure detect portion formed in the piston member 20, there is disposed a support piece 25b through a hinge portion 25a integrally with the beam 25, while the brake member 16 and holder 16a are respectively mounted on the support piece 25b through bolts 37. Due to provision of such hinge structure, even in case where there exist dimensional errors and/or mounting errors in the brake member 16 and holder 16a, when the piston member 20 is moved toward the side surface 3a of the guide rail 3 and is then contacted with the side surface 3a, the hinge portion 25a is elastically deformed to thereby absorb such dimensional errors and/or mounting errors, so that the whole of the brake member 16 can be pressure contacted with the side surface 3a of the guide rail 3 substantially uniformly.

In the case of the second embodiment, since the brake member 16 and holder 16a are structured such that they can be moved integrally with the piston member 20, there is omitted the plate spring for returning the brake member as in the first embodiment and thus the brake member 16 and holder 16a are supported on the skirt portion 15a of the unit main body 15 through a linear guide 38 serving as a support device which substitutes the plate spring.

The linear guide 38 is composed of a guide rail 39 and a bearing 40; and, the guide rail 39 is mounted on the skirt portion 15a of the unit main body 15, whereas the bearing 40 is mounted on the holder 16a. The guide rail 39 extends in a direction at right angles to the longitudinal direction of the guide rail 3, while the holder 16a can be moved along the guide rail 39. And, pressure has been previously applied to the linear guide 38 and the holder 16 is supported with high rigidity in other directions than the moving direction thereof, that is, in the longitudinal and vertical directions of the guide rail 3.

In the linear guide apparatus 1 according to the second embodiment as well, similarly to the first embodiment, while the piston member 20 of the oil pressure cylinder 17 retreats in the direction to part away from the side surface 3a of the guide rail 3, the brake member 16 is held in a state in which it is separated from the side surface 3a of the guide rail 3. Therefore, in this state, the response characteristic of the movement of the slider 4 to be driven by the drive device 5 can be kept in a good condition.

In this state, in case where the pressure oil is supplied from the oil pressure supply device 23 into the first oil chamber 21a of the oil pressure cylinder 17, due to the pressure of the pressure oil, the piston member 20, integrally with the brake member 16, is caused to advance in a direction to approach the side surface 3a of the guide rail 3; in response to the advancing movement of the piston member 20, the brake member 16 is pressure contacted with the side surface 3a of the guide rail 3 to thereby produce a frictional force between them; and, owing to such frictional force, the damping characteristic and rigidity of the linear guide apparatus 1 can be enhanced. The frictional force of the brake member 1 can be adjusted by controlling the oil pressure supply device 23 through the control unit 7.

When the brake member 16 is pressed through the beam 25, there is produced in the beam 25 a strain which corresponds to the pressure, and the level of the strain is detected by the strain gauge 27. And, a detect signal issued from the strain gauge 27 is sent to the control unit 7.

Also, in case where the pressure oil is supplied into the second oil chamber 21b of the oil pressure cylinder 17 from the oil pressure supply device 23, due to the pressure of the pressure oil, the piston member 20 is caused to retreat in a direction to part away from the side surface 3a of the guide rail 3.

And, because the brake member 16 is integrally connected to the piston member 20, with the retreating movement of the piston member 20, the brake member 16 is also retreated integrally with the piston 20 in the direction to part away from the side surface 3a of the guide rail 3; and, because of the retreating movement of the brake member 16, the frictional force existing between the brake member 16 and the side surface 3a of the guide rail 3 is caused to vanish, thereby being able to enhance the response characteristic of the movement of the slider 4.

As described above, the brake member 16 is structured so as to move integrally with the piston member 20 and; therefore, the brake member 16 can be operated quickly with no delay with respect to the operation of the piston member 20, that is, with a good response characteristic with respect to the operation of the piston member 20.

And, since the brake member 16 supported through the holder 16a is supported by the linear guide 38 with high rigidity in the longitudinal and vertical directions of the guide rail 3, the frictional force to be produced between the brake member 16 and the side surface 3a of the guide rail 3 can be controlled with high accuracy.

Further, in the present linear guide apparatus 1, similarly to the first embodiment, because the brake member 16 is contacted with other portions of the side surface 3a of the guide rail 3 than the rolling body rolling groove 8 thereof, not only the slider 4 is prevented from being pushed up but also the rolling body rolling groove 8 is prevented against wear. This makes it possible to keep the positioning accuracy of the slider 4 and table 2 at a high level.

By the way, the invention is not limited to a linear guide apparatus of a rolling guide type in which a large number of rolling bodies are interposed between a guide member and a slider, but can also apply to a linear guide apparatus of a sliding type.

As has been described heretofore, according to the invention, since a brake member is contacted with other portions of the side surface of a guide member than the guide surface thereof to thereby produce a frictional force between them, not only a slider can be prevented from being pushing up but also the guide surface can be prevented against wear. Thanks to this, the positioning accuracy of the slider can be kept at a high level.

Also, a drive device for driving the brake member includes an advance and retreat member movable in a direction to be contacted with and separated from the side surface of the guide member, the advance and retreat member can be driven in a direction to approach the side surface of the guide member to thereby press the brake member against the side surface of the guide member, the advance and retreat member can be driven in a direction to part away from the side surface of the guide member to thereby remove the pressure of the brake member from the side surface of the guide member, and the brake member is supported with high rigidity in the other directions thereof than the direction to be contacted with and separated from the side surface of the guide member. Thanks to this, the brake member can be operated with no delay with respect to the operation of the advance and retreat member, that is, can be operated quickly with a good response characteristic with respect to the operation of the advance and retreat member, thereby being able to control the frictional force of the brake member with high accuracy.

What is claimed is:

1. A linear guide apparatus comprising:
   a guide member including a guide surface formed on an outer surface thereof;
   a slider disposed on said guide member so as to be movable along a longitudinal direction of said guide member and including a load guide surface formed so as to face said guide surface of said guide member;
   a brake member disposed so as to face a side surface of said guide member and so as to be contactable with portions of said side surface of said guide member other than said guide surface;
   a drive device including an advance and retreat member movable in a direction toward and away from said side surface of said guide member, said drive device being capable of driving said advance and retreat member in the direction toward said side surface of said guide member to thereby press said brake member against said side surface of said guide member and also capable of driving said advance and retreat member in the direction away from said side surface of said guide member to thereby remove the pressure thereof; and
   a resilient support member disposed substantially parallel with said side surface of said guide member so as to allow a clearance between said side surface and said brake member,
   wherein said support member is supported in longitudinal and vertical directions of the guide member with a rigidity that is higher than a rigidity with which it is supported in said direction toward and away from said side surface of said guide member.

2. The linear guide apparatus of claim 1, wherein said drive device is one of a piezoactuator, a pneumatic cylinder, and a solenoid.

3. The linear guide apparatus of claim 1, wherein said drive device is a pressure cylinder, and said advance and retreat member is a piston disposed within said pressure cylinder.

4. The linear guide apparatus of claim 3, further comprising a first chamber on one side of said piston and a second chamber disposed on the other side of said piston, so that when pressure is applied to said piston from said first chamber, said piston is moved toward said guide member, and when pressure is applied to said piston from said second chamber, said piston is moved in a direction away from said guide member.

5. The linear guide apparatus of claim 4, wherein said first chamber and said second chamber are not connect to one another through said piston.

6. The linear guide apparatus of claim 4, wherein said pressure cylinder is connected to a pressurized-fluid supply source so that pressurized fluid may selectively be supplied to said first and second chambers.

7. The linear guide apparatus of claim 1, wherein there is no spring member disposed so as to bias said brake member away from said guide member.

* * * * *